United States Patent
Chang et al.

(10) Patent No.: US 10,235,361 B2
(45) Date of Patent: *Mar. 19, 2019

(54) CONTEXT-AWARE TRANSLATION MEMORY TO FACILITATE MORE ACCURATE TRANSLATION

(71) Applicant: INTERNATIONAL BUSINESS MACHINES CORPORATION, Armonk, NY (US)

(72) Inventors: Chi-Ying Chang, New Taipei (TW); Yi-Chun Chen, Taipei (TW); Wen-Ping Chi, New Taipei (TW); Chao Yuan Huang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,257

(22) Filed: Feb. 15, 2017

(65) Prior Publication Data

US 2018/0232364 A1      Aug. 16, 2018

(51) Int. Cl.
*G06F 17/20*         (2006.01)
*G06F 17/28*         (2006.01)
*G06F 3/0481*        (2013.01)

(52) U.S. Cl.
CPC ........ *G06F 17/2836* (2013.01); *G06F 3/0481* (2013.01); *G06F 17/2818* (2013.01)

(58) Field of Classification Search
CPC . G06F 9/4446; G06F 17/2836; G06F 11/3604
USPC ........................................................ 704/2–9
See application file for complete search history.

(56) References Cited

U.S. PATENT DOCUMENTS

| | | | | |
|---|---|---|---|---|
| 5,974,372 A | * | 10/1999 | Barnes | G06F 9/4448 704/7 |
| 6,442,516 B1 | * | 8/2002 | Lee | G06F 9/4448 704/8 |
| 7,447,624 B2 | * | 11/2008 | Fuhrmann | G06F 9/454 704/8 |

(Continued)

OTHER PUBLICATIONS

Mckethan et al, "Demystifying software globalization.", 2005, In Translation Journal 9.2 (2005): pp. 1-8.*

(Continued)

*Primary Examiner* — Olujimi Adesanya
(74) *Attorney, Agent, or Firm* — Michael O'Keefe

(57) ABSTRACT

A method for context-aware translation is provided. The present invention may include receiving a program integrated information file (PII) associated with a graphical user interface object of with a software product. The present invention may also include indexing each element string within the PII file. The present invention may further include generating a base language general availability build of the graphical user interface object using the PII file. The present invention may also include retrieving a document object model (DOM) of each element within the base language general availability build. The present invention may further include creating a string relation table for the base language general availability build using the DOM for each element and each indexed element string within the PII file. The present invention may also include generating a string relation translation memory table for at least one language.

17 Claims, 8 Drawing Sheets

(56) References Cited

U.S. PATENT DOCUMENTS

| | | | |
|---|---|---|---|
| 7,581,208 B2* | 8/2009 | Aoyama | G06F 9/4448 717/124 |
| 7,627,479 B2 | 12/2009 | Travieso et al. | |
| 7,698,688 B2* | 4/2010 | Fujiwara | G06F 9/4448 704/8 |
| 7,784,026 B1* | 8/2010 | Wong | G06F 9/454 717/109 |
| 8,170,864 B2* | 5/2012 | Huang | G06F 9/4448 704/8 |
| 8,510,094 B2 | 8/2013 | Chin et al. | |
| 8,903,710 B2 | 12/2014 | Luo et al. | |
| 9,292,154 B2 | 3/2016 | Ji et al. | |
| 9,665,569 B2 | 5/2017 | Jellison, Jr. | |
| 2003/0115552 A1* | 6/2003 | Jahnke | G06F 9/454 715/201 |
| 2003/0212982 A1* | 11/2003 | Brooks | G06F 9/4448 717/100 |
| 2004/0236715 A1* | 11/2004 | Krebs | G06F 9/4448 |
| 2005/0240905 A1 | 10/2005 | Poumasseh et al. | |
| 2006/0004738 A1 | 1/2006 | Blackwell et al. | |
| 2006/0026464 A1* | 2/2006 | Atkin | G06F 11/3688 714/38.1 |
| 2006/0294463 A1 | 12/2006 | Chu et al. | |
| 2007/0050757 A1 | 3/2007 | van Woerkom et al. | |
| 2007/0118497 A1* | 5/2007 | Katoh | G06F 9/4448 |
| 2008/0015842 A1 | 1/2008 | Moore | |
| 2008/0066057 A1 | 3/2008 | Aoyama et al. | |
| 2008/0172603 A1 | 7/2008 | Agarwal et al. | |
| 2008/0189096 A1 | 8/2008 | Apte et al. | |
| 2008/0195377 A1* | 8/2008 | Kato | G06F 17/2836 704/8 |
| 2009/0282394 A1* | 11/2009 | Raj | G06F 9/4448 717/136 |
| 2009/0327866 A1* | 12/2009 | Li | G06F 17/30 715/234 |
| 2010/0100369 A1 | 4/2010 | Shetty et al. | |
| 2010/0211377 A1 | 8/2010 | Aoyama et al. | |
| 2012/0109625 A1* | 5/2012 | Luo | G06F 17/2247 704/2 |
| 2013/0086224 A1* | 4/2013 | Teraguchi | G06F 17/30312 709/219 |
| 2013/0290933 A1* | 10/2013 | He | G06F 11/3668 717/124 |
| 2014/0033097 A1* | 1/2014 | Chiang | G06F 3/0481 715/765 |
| 2014/0096027 A1* | 4/2014 | Ji | G06F 3/048 715/744 |
| 2015/0039287 A1* | 2/2015 | Han | G06F 17/289 704/2 |
| 2015/0161160 A1* | 6/2015 | Chen | G06F 9/4448 707/639 |
| 2015/0186132 A1* | 7/2015 | Oliveri | G06F 8/34 717/120 |
| 2016/0139914 A1* | 5/2016 | Levi | G06Q 10/00 717/121 |
| 2016/0179789 A1* | 6/2016 | Chen | G06F 17/289 704/3 |
| 2016/0314117 A1 | 10/2016 | Bartley et al. | |
| 2017/0083200 A1 | 3/2017 | Bartley et al. | |
| 2017/0322944 A1 | 11/2017 | Farr et al. | |
| 2018/0101522 A1* | 4/2018 | Fujiwara | G06F 17/2775 |

OTHER PUBLICATIONS

IBM: List of IBM Patents or Patent Applications Treated as Related (Appendix P), Oct. 12, 2017, pp. 1-2.

Chang et al., Pending U.S. Appl. No. 15/708,414, filed Sep. 19, 2017, titled "Context-Aware Translation Memory to Facilitate More Accurate Translation", pp. 1-32.

Mell, et al., "The NIST Definition of Cloud Computing," National Institute of Standards and Technology, U.S. Department of Commerce, Special Publication 800-145, Sep. 2011, pp. 1-7.

IBM: List of IBM Patents or Patent Applications Treated as Related (Appendix P), Apr. 24, 2018, pp. 1-2.

Chang et al., Pending U.S. Appl. No. 15/398,355, filed Mar. 28, 2018, titled: Context-Aware Translation Memory to Facilitate More Accurate Translation, pp. 1-26.

Chang et al., Pending U.S. Appl. No. 15/938,318, filed Mar. 28, 2018, titled: Context-Aware Translation Memory to Facilitate More Accurate Translation, pp. 1-34.

* cited by examiner

| Strings | Translation | Neighbor string | Rate for translation among previous builds or products in same domain |
|---|---|---|---|
| OK | 승낙 | Cancel, ID | 92% |
| OK | 확인 | Cancel, ID | 27% |
| OK | 승낙 | ID, Password | 88% |
| OK | 확인 | ID, Password | 35% |
| OK | 승낙 | Password, Cancel | 90% |
| OK | 확인 | Password, Cancel | 45% |
| OK | 확인 | Are you sure?, Cancel | 62% |
| OK | 정 | Are you sure?, Cancel | 81% |
| OK | 확인 | Please Confirm, Cancel | 65% |
| OK | 정 | Please Confirm, Cancel | 83% |

CONTEXT-AWARE TRANSLATION MEMORY TO FACILITATE MORE ACCURATE TRANSLATION

BACKGROUND

The present invention relates, generally, to the field of computing, and more particularly to software language translation.

Computer programs may present information to a user in different languages. Upon installation of a program, the user may designate, from a list, the language in which the computer program may present information. For example, the user may be presented with a drop down menu listing the English language, the French language, the German Language, and the Spanish language. Therefore, the program developer may design the graphical user interface to properly accommodate translation into each of the presented languages.

SUMMARY

According to one embodiment, a method, computer system, and computer program product for context-aware translation is provided. The present invention may include receiving a program integrated information file associated with a graphical user interface object of with a software product. The present invention may also include indexing each element string within the received program integrated information file. The present invention may further include generating a base language general availability build of the graphical user interface object using the received program integrated information file. The present invention may also include retrieving a document object model of each element within the generated base language general availability build. The present invention may further include creating a string relation table for the generated base language general availability build using the retrieved document object model for each element and each indexed element string within the received program integrated information file. The present invention may also include generating a string relation translation memory table for at least one language using the created string relation table and a translation resource file associated with the at least one language.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5 is a block diagram of a string relation table according to at least one embodiment;

DETAILED DESCRIPTION

Figure 1:
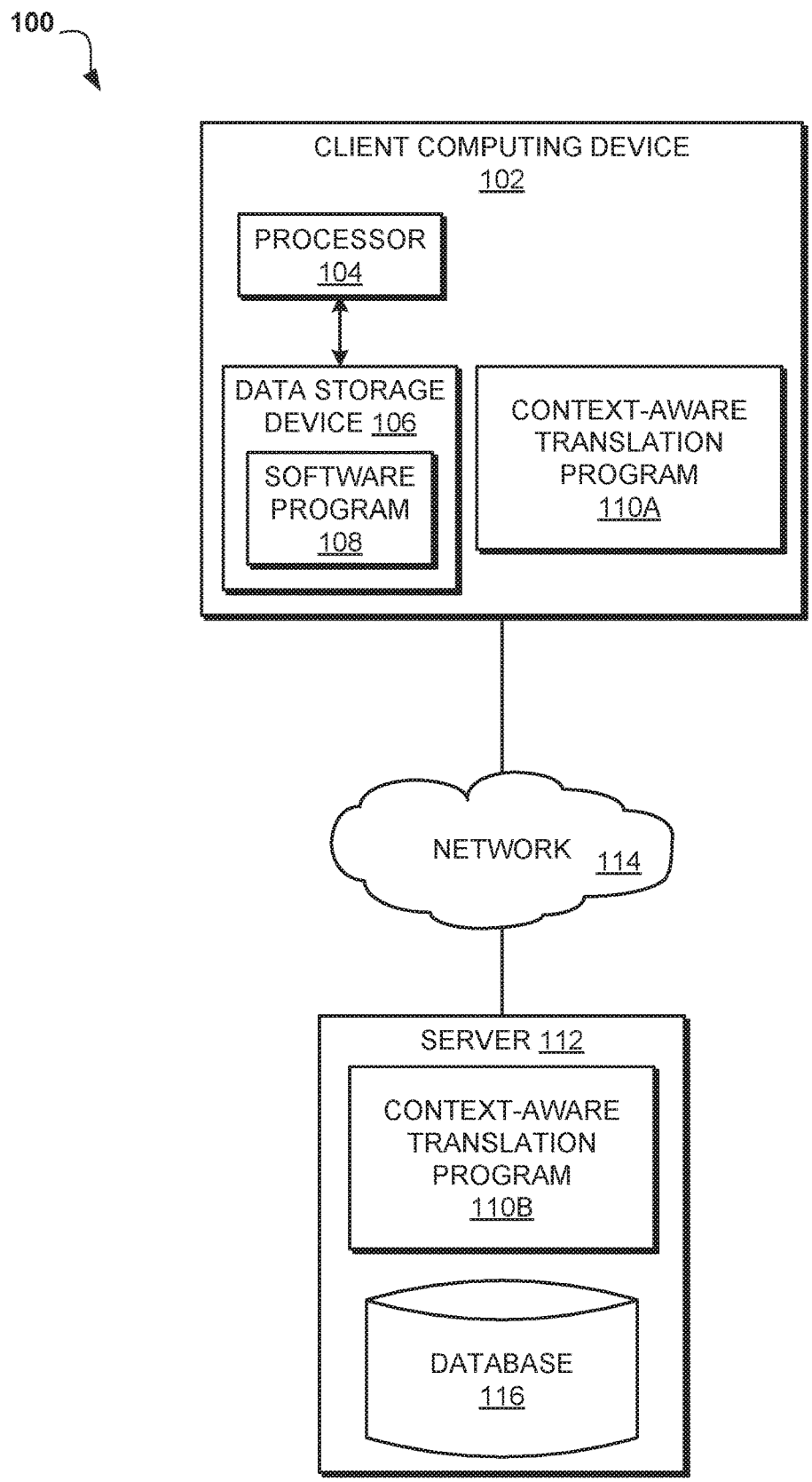
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to software language translation. The following described exemplary embodiments provide a system, method, and program product to, among other things, analyze relationship information associated with a graphical user interface of a software program to select or suggest an accurate language translation. Therefore, the present embodiment has the capacity to improve the technical field of software language translation by increasing translation accuracy based on identifying the context of sibling strings.

As previously described, computer programs may present information to a user in different languages. Upon installation of a program, the user may designate, from a list, the language in which the computer program may present information. For example, the user may be presented with a drop down menu listing the English language, the French language, the German Language, and the Spanish language. Therefore, the program developer may design the graphical user interface to properly accommodate translation into each of the presented languages.

Typically, when strings of text are translated into different languages for graphical user interface (GUI) objects, only the files containing the text strings are translated. Translation techniques may not consider how some GUI objects, such as buttons and labels, will be understood by the user in the context of other viewable GUI objects. For example, the translation of the term "Accept" to a non-English language may not be the same for an "accept" button GUI object on a license agreement panel and an "accept" button GUI object on a file transfer dialogue box. As such, it may be advantageous to, among other things, perform a translation verification test that analyzes all GUI objects to be depicted to determine relationships between GUI objects that will be viewable to users.

According to one embodiment, when a string of text is to be translated in a GUI object, an accurate translation may depend on the neighboring text strings and elements. String relation translation memory (SRTM) may be used to determine and store relationships between multiple strings. The relationship may be stored in a table and analyzed to calculate a rating for a number of proposed translations. The highest rated potential translation may be selected as the most accurate translation and automatically inserted into the translated GUI object. In at least one embodiment, a user may be presented with all proposed translations based on the relationship between the string and each sibling string to allow the user to select the most accurate translation for the GUI object.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize a translation verification test that analyzes the context in which a text string is used in relation to neighboring text strings within a GUI object to determine an accurate language translation for the text string.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a context-aware translation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102 may include internal components 602a and external components 604a, respectively.

The server computer 112 may be a laptop computer, netbook computer, personal computer (PC), a desktop computer, or any programmable electronic device or any network of programmable electronic devices capable of hosting and running a context-aware translation program 110B and a database 116 and communicating with the client computing device 102 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the context-aware translation program 110A, 110B may be a program capable of analyzing information associated with GUI objects presented in a file, such as a program integrated information file, to determine the relationship between text presented in each GUI object. The context-aware translation program 110A, 110B may then be capable of providing at least one translation suggestion or selecting a best fit translation for each GUI object to be translated. The context-aware translation method is explained in further detail below with respect to FIG. 2.

Figure 2:
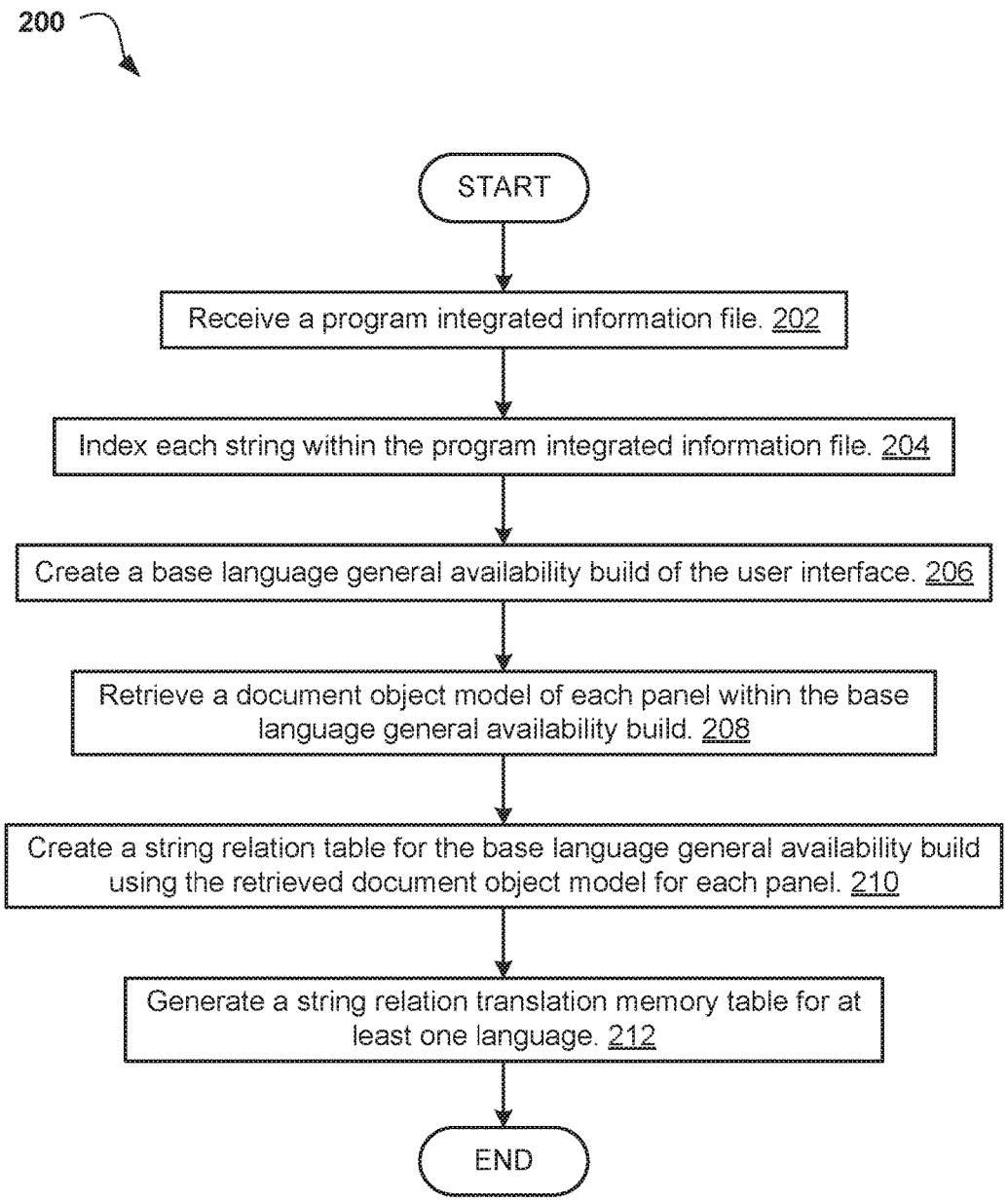
FIG. 2 is an operational flowchart illustrating a context-aware translation process according to at least one embodiment.

Referring now to FIG. 2, an operational flowchart illustrating a context-aware translation process 200 is depicted according to at least one embodiment. At 202, the context-aware translation program 110A, 110B receives a program integrated information file. A program integrated information file may store text content associated with an application, such as software program 108, displayed within a GUI during program execution. Information stored within a program integrated information file may include Java® (Java and all Java-based trademarks and logos are trademarks or registered trademarks of Oracle Corporation and/or its affiliates) environment property files and Microsoft.NET (Microsoft.NET and all Microsoft-based trademarks and logos are trademarks or registered trademarks of Microsoft Corporation and/or its affiliates) environment resource files.

Then, at 204, the context-aware translation program 110A, 110B indexes each string within the program integrated information file. Upon receiving the program integrated information file, the context-aware translation program 110A, 110B may mark the program integrated information file with invisible Unicode characters to index each element string stored within the file and associated with a GUI object. For example, the received program integrated information file may contain information for a GUI object with four strings (i.e., "Field_ID=ID", "Field_Password=Password", "Button_Cancel=Cancel", and "Button_OK=OK"). The context-aware translation program 110A, 110B may add invisible Unicode characters as the index for the program integrated information file (i.e., "Field_ID=ID\u2063\u2063\u2063\u2063", "Field_Password=Password\u2063\u2063\u2063\u200B", "Button_Cancel=Cancel\u2063\u2063\u200B\u2063", and "Button_OK=OK\u2063\u2063\u200B\u200B" where u2063 represents "0" and u200B represents "1"). Therefore, the ID element may be index 0, the Password element may be index 1, the Cancel element may be index 2, and the OK element may be index 3.

Next, at 206, the context-aware translation program 110A, 110B creates a base language general availability build of the user interface. Using the received program integrated information file with the indexed elements, the context-aware translation program 110A, 110B may create a base language general availability build for translation into various languages by merging the received program integrated information file with the indexed elements. Since the index characters may be invisible in the indexed program integrated information file, the user interface may not be visually affected by the creation of the base language general availability build. However, the context-aware translation program 110A, 110B or a computer program, such as software program 108 or an inspector program, may be capable of analyzing the base language general availability build and locate a string from the user interface. The context-aware translation program 110A, 110B may use English as the base language for the general availability build for each product within a certain domain. For example, a general availability build of a user interface display box may be created in English using the program integrated information file that can be used to create translations into various languages.

Then, at 208, the context-aware translation program 110A, 110B retrieves a document object model of each element within the base language general availability build and locates each string within the program integrated information file based on the invisible characters for each element. For each element within a GUI object, the context-aware translation program 110A, 110B may retrieve a document object model. A document object model is an application programming interface that handles documents in a tree structure where each node is an object within the document. Additionally, the context-aware translation program 110A, 110B may locate each string from the program integrated information file based on the invisible characters associated with each string. For example, the context-aware translation program 110A, 110B may be able to locate the ID element in the indexed program integrated information file since the ID element may be listed as index 0.

Next, at 210, the context-aware translation program 110A, 110B creates a string relation table for the base language general availability build using the retrieved document object model for each element and located strings from the program integrated information file. The document object model retrieved by the context-aware translation program 110A, 110B may include relationship information for each element within the GUI object. For example, a document object model may identify neighboring elements, such as direct parent elements, sibling elements, and direct child elements. By parsing through each element and determining the neighboring elements, the context-aware translation program 110A, 110B may be able to determine the relationship between specific elements within a GUI object. The context-aware translation program 110A, 110B may create a string relation table that details the relationship between the elements within a GUI object as detailed by the domain model object. For example, a string relation table detailing the relationship between elements of a GUI object that asks a user to enter an identification and password may appear as follows:

| Strings | DOM Object ID | String ID | Neighbor strings |
|---|---|---|---|
| OK | myOK | Button_OK_1 | Cancel, ID, Password |
| Cancel | myCancel | Button_Cancel_1 | OK, ID, Password |
| ID | myID | Field_ID | OK, Cancel, Password |
| Password | myPSW | Field_Password | OK, Cancel, ID |

Additionally, the context-aware translation program 110A, 110B may create the string relation table from document object models and program integrated information files indexed with invisible characters of corresponding product general availability builds for product within the same family. For example, if a product (i.e., product A) is a member of a family of products (i.e., product A, product B, and product C), the context-aware translation program 110A, 110B may create the string relation table for product A from document object models and program integrated information files for product B and product C. Similarly, the context-aware translation program 110A, 110B may create the string relation table from document object models and program integrated information files indexed with invisible characters of corresponding product general availability builds for different versions of the same product. For example, if a product (i.e., product A) is about to release product version 3, the context-aware translation program 110A, 110B may create the string relation table for product A version 3 from document object models and program integrated information files for product A version 1 and product A version 2. Furthermore, a string relation table may be created for each product within a family and/or each version of a specific product and use each created string relation table to create a string relation translation memory table with calculated probabilities.

Then, at 212, the context-aware translation program 110A, 110B generates a string relation translation memory table for at least one language. Using the created string relation table and a translation resource file, a string relation translation memory table may be generated that displays possible translations for each element within a GUI object based on the relationship between various elements displayed in the GUI object. As previously described, the string relation translation memory table may be created using string relation tables created from different products within the same family or different versions of the same product. The context-aware translation program 110A, 110B may calculate a translation rate percentage for each element within a GUI object based on the context of use of each element within the GUI object and the relationship between the element and neighboring elements in the GUI object. For example, based on the relationship of an "OK" element in a GUI object, the context-aware translation program 110A, 110B may suggest a specific translation is appropriate with a 92% certainty based on the context of use of the "OK" element and the relationship with neighboring elements, such as a "Cancel" element, a "ID" element, and a "Password" element. However, the context-aware translation program 110A, 110B may also display another translation with a 35% certainty as being the best translation based on the relationship between the element and other elements within the GUI object. The context-aware translation program 110A, 110B may display higher translation rate probability scores in different colors. For example, translation rate probability scores between 85% and 100% may be displayed in red to indicate a high probability that the translation is accurate based on relationships with other elements and with a previous language used in earlier builds or products in the same domain.

Figure 3:
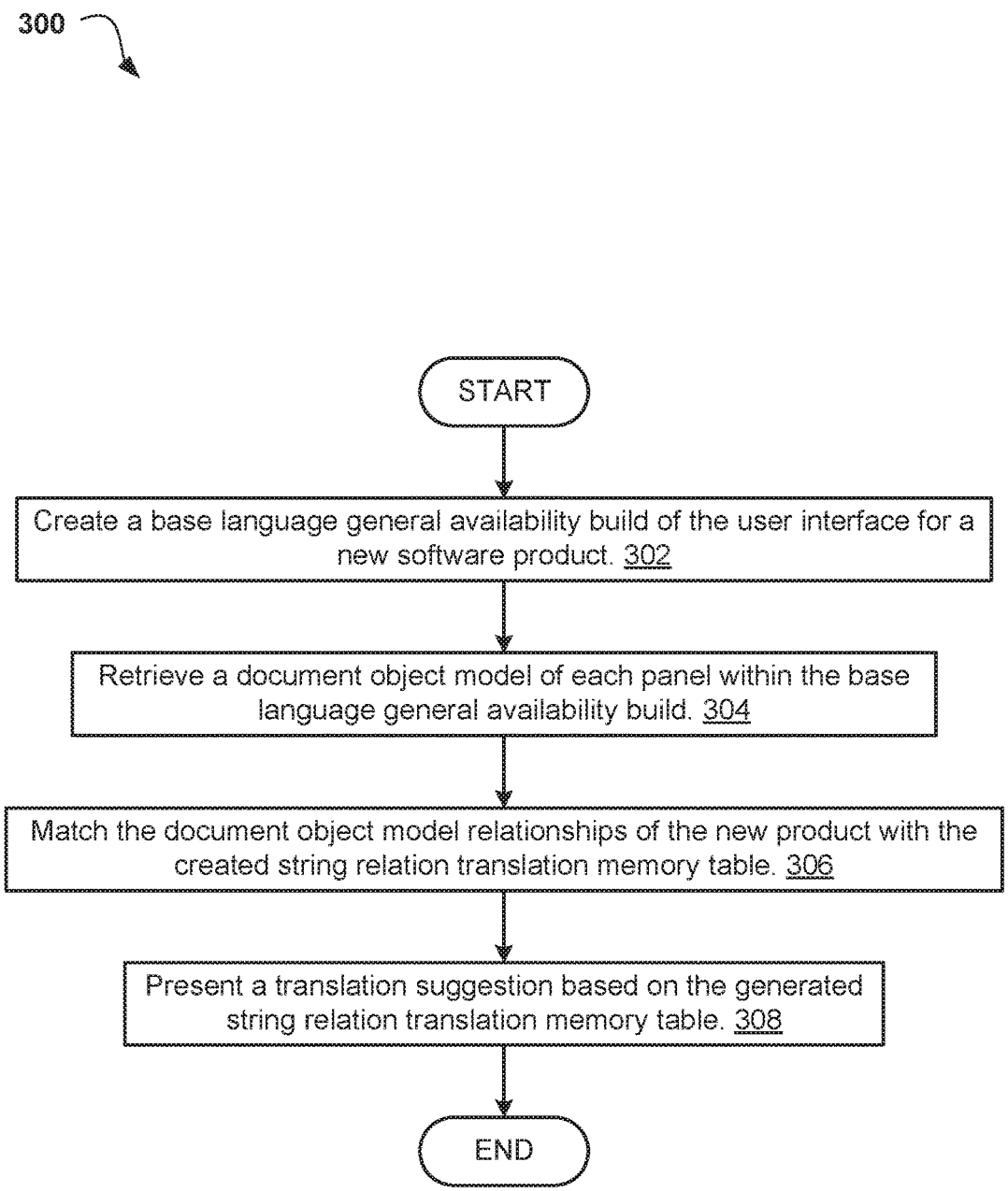
FIG. 3 is an operational flowchart illustrating a string relation translation memory table use process according to at least one embodiment.

Referring now to FIG. 3, an operational flowchart illustrating a string relation translation memory table use process 300 is depicted according to at least one embodiment. At 302, the context-aware translation program 110A, 110B creates a base language general availability build of the user interface for a new software product. When a new product is created with which the created string relation translation memory table may be used, the context-aware translation program 110A, 110B may need to determine the element relationships within the GUI object. The context-aware translation program 110A, 110B may be able to determine the element relationships by receiving the program integrated information file for the new product similar to step 202, indexing each element string within the received program integrated information file for the new product similar to step 204, and creating a base language general availability build for the new software product similar to step 206.

Then, at 304, the context-aware translation program 110A, 110B retrieves a document object model of each panel within the base language general availability build. Similar to step 208, the context-aware translation program 110A, 110B may retrieve a document object model for each element within the created general availability build for the new product. As previously described, a document object model is an application programming interface that handles documents in a tree structure where each node is an object within the document. Each document object model may detail the relationship each element within the GUI object has with neighboring elements. Additionally, the context-aware translation program 110A, 110B may also locate each element string from the program integrated information file for the new product using the invisible characters within the general availability build.

Next, at 306, the context-aware translation program 110A, 110B matches the document object model relationships of the new product with the created string relation translation memory table. Once each document object model has been retrieved, the context-aware translation program 110A, 110B may match the document object model relationships of the new product with the relationships of the same document object model on the string relation translation memory table created from other product family members and earlier product versions. For example, a document object model for a new product may be compared to a created string relation translation memory table for a product family to determine which translation is most appropriate for an element of a GUI object based on the neighboring objects. The context-aware translation program 110A, 110B may utilize an inspector program, such as a firebug, to inspect HTML and document object model objects when generating a string relation translation memory table and using a string relation translation memory table to make a suggestion or translation.

Then, at 308, the context-aware translation program 110A, 110B presents the translation suggestion based on the generated string relation translation memory table. Once the context-aware translation program 110A, 110B creates the generated string relation translation memory table, the context-aware translation program 110A, 110B may suggest a translation for each element of the GUI object by presenting the generated string relation translation memory table to the user. The context-aware translation program 110A, 110B may allow the user to select a translation by interacting with the generated string relation translation memory table. Once the context-aware translation program 110A, 110B receives a user selection, the user selection may be used to perform the translation.

In at least one embodiment, the context-aware translation program 110A, 110B may automatically select the translation for an element within the GUI object based on the highest translation rate probability score. For example, if the context-aware translation program 110A, 110B generates a string relation translation memory table that has the highest translation rate probability score for the "登錄" translation of an "OK" button, then the context-aware translation program 110A, 110B may use the "登錄" translation without prompting the user to make a translation selection of the proper translation.

Figure 4:
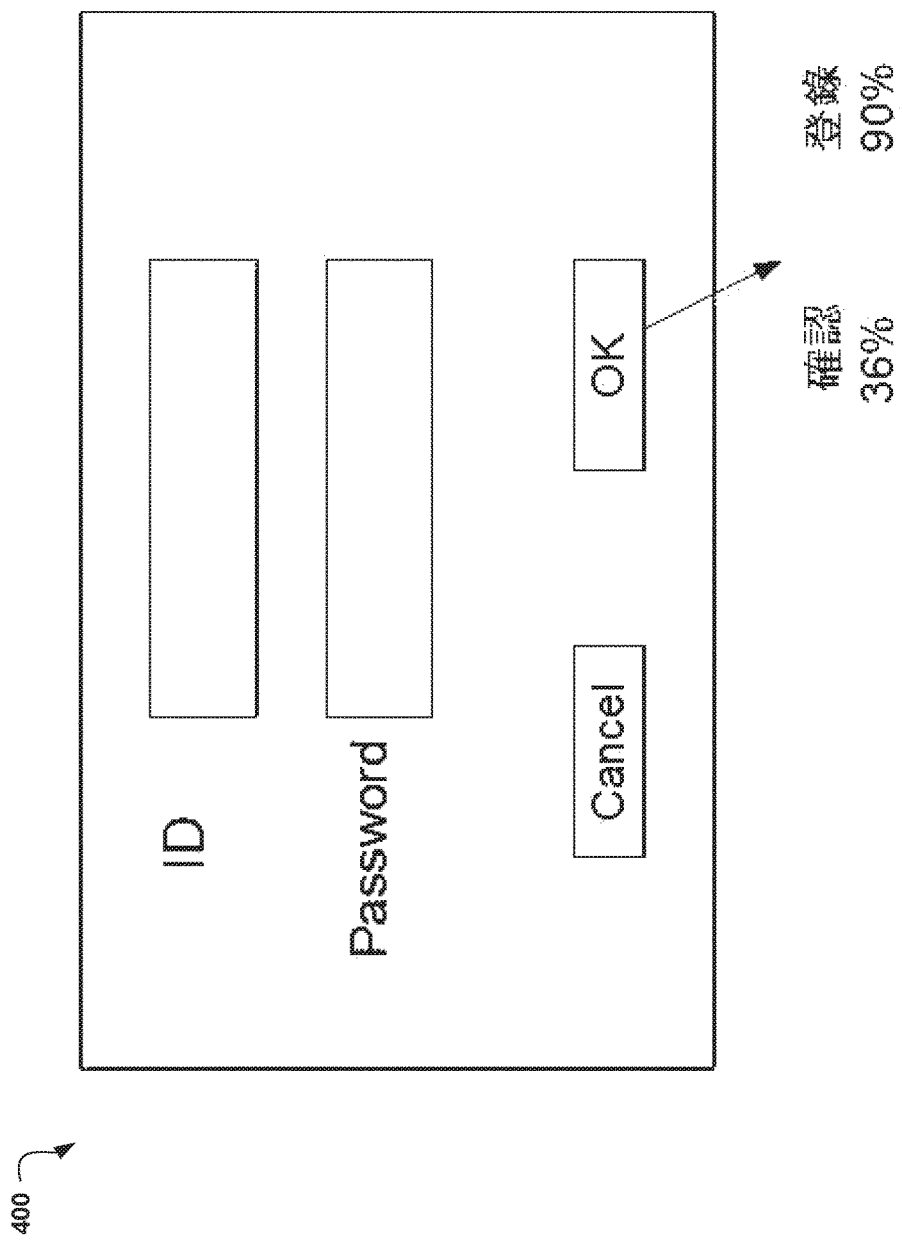
FIG. 4 is a block diagram of a translation suggestion box based on the relationship of graphical user interface elements according to at least one embodiment.

Referring now to FIG. 4, a block diagram of a translation suggestion box 400 based on the relationship of graphical user interface elements is depicted, according to at least one embodiment. The translation suggestion box 400 may be presented to a user to allow the user to select a translation that is most suitable to the GUI objected being translated. When presenting the translation suggestion box 400, the context-aware translation program 110A, 110B may display the base language general availability build and display several translation suggestions for a user to select. For example, the translation suggestion box 400 may display the "登錄" translation and the "確認" translation alongside the "OK" GUI object to be translated.

Referring now to FIG. 5, a block diagram of a string relation table 500 is depicted, according to at least one embodiment. The string relation table 500 may be created by parsing the information within a document object model for each GUI object. As previously described, the string relation table 500 may detail the relationship between the elements within a GUI object as detailed by the domain model object. For example, the string relation table 500 may include rows for each string translation that further details the neighboring strings and a translation rate percentage for each translation of the string.

It may be appreciated that FIGS. 3-5 provide only an illustration of one implementation and does not imply any limitations with regard to how different embodiments may be implemented. Many modifications to the depicted environments may be made based on design and implementation requirements.

Figure 6:
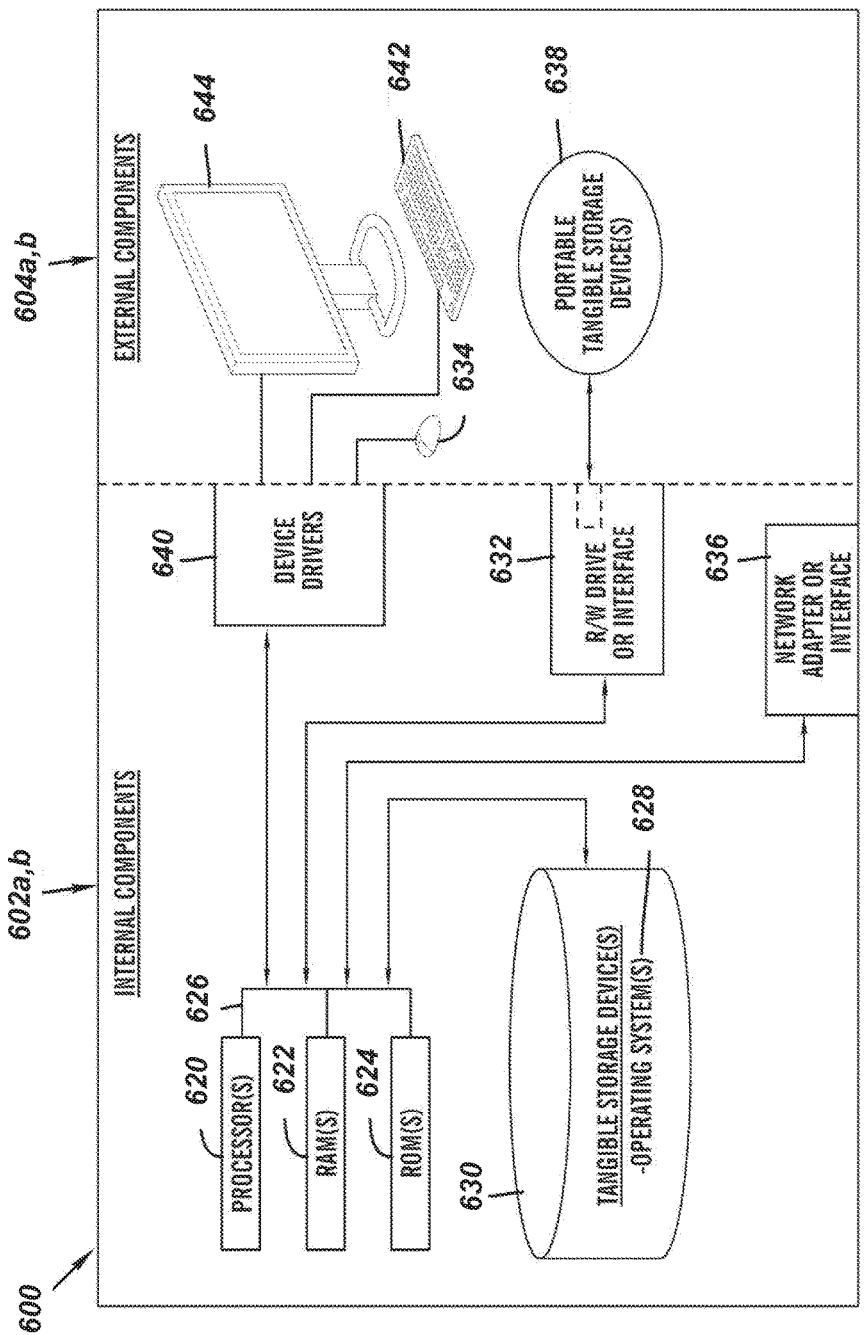
FIG. 6 is a block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 602 a,b and external components 604 a,b illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the software program 108 and the context-aware translation program 110A in the client computing device 102 and the context-aware translation program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the context-aware translation program 110A, 110B, can be stored on one or more of the respective portable computer-readable tangible storage devices 638, read via the respective R/W drive or interface 632, and loaded into the respective hard drive 630.

Each set of internal components 602 *a,b* also includes network adapters or interfaces 636 such as a TCP/IP adapter cards, wireless Wi-Fi interface cards, or 3G or 4G wireless interface cards or other wired or wireless communication links. The software program 108 and the context-aware translation program 110A in the client computing device 102 and the context-aware translation program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the software program 108 and the context-aware translation program 110A in the client computing device 102 and the context-aware translation program 110B in the server 112 are loaded into the respective hard drive 630. The network may comprise copper wires, optical fibers, wireless transmission, routers, firewalls, switches, gateway computers and/or edge servers.

Each of the sets of external components 604 *a,b* can include a computer display monitor 644, a keyboard 642, and a computer mouse 634. External components 604 *a,b* can also include touch screens, virtual keyboards, touch pads, pointing devices, and other human interface devices. Each of the sets of internal components 602 *a,b* also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
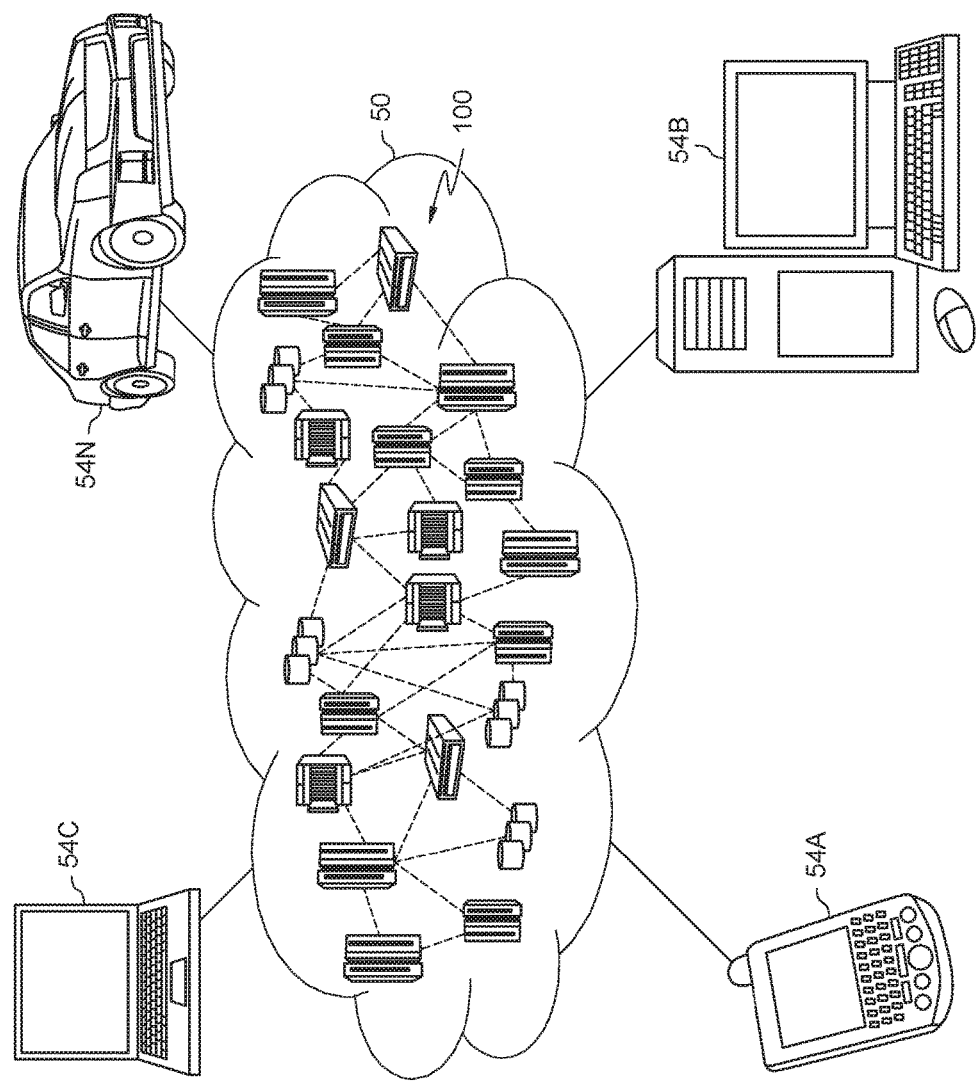
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
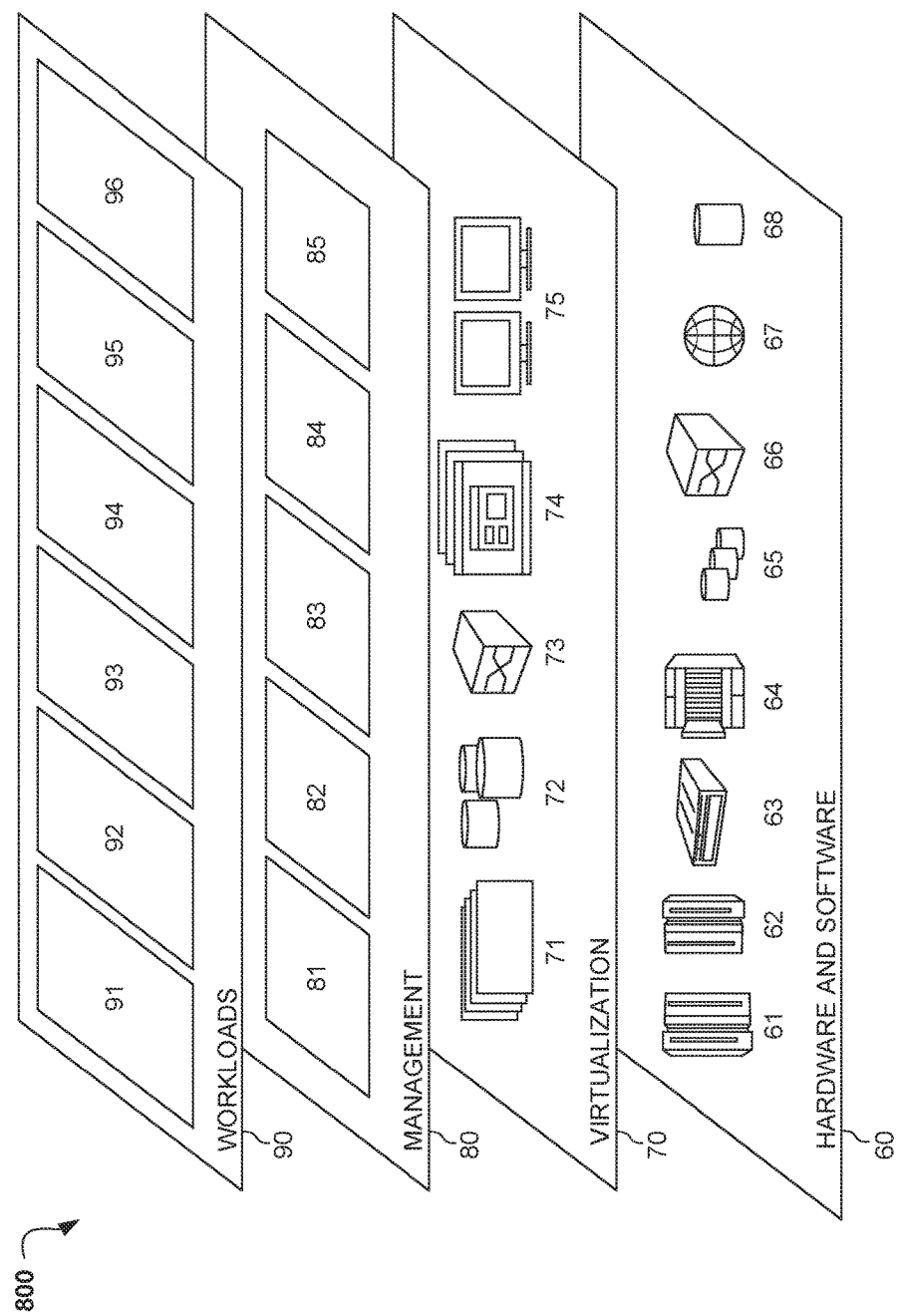
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and context-aware translation 96. Context-aware translation 96 may relate to analyzing data within a document object model to determine relationships between GUI objects to be translated and selecting or suggesting at least one language translation for the GUI objects based on the determined relationships.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for context-aware translation to increase translation accuracy based on identifying a context between one or more sibling text strings, the method comprising:

receiving, by a processor, a program integrated information file associated with a graphical user interface object of a software product;

indexing each element string within the received program integrated information file;

generating a base language general availability build of the graphical user interface object using the received program integrated information file;

retrieving a document object model of each element within the generated base language general availability build;

creating a string relation table for the generated base language general availability build using the retrieved document object model for each element and each indexed element string within the received program integrated information file;

generating a string relation translation memory table for at least one language using the created string relation table and a translation resource file associated with the at least one language, and wherein the generated string relation translation memory table includes a translation rate probability score for each element within the graphical user interface object that relates to the accuracy of each translation, and wherein each translation rate probability score is displayed within the generated string relation translation memory table in a color corresponding to a preconfigured threshold value;

generating a base language general availability build for a graphical user interface object associated with a new software product using an indexed program integrated information file associated with the new software product;

retrieving a document object model for each element within the generated base language general availability build for the graphical user interface object associated with the new software product;

matching a document object model relationship associated with an element of the graphical user interface object associated with the new software product with a document object model relationship on the generated string relation translation memory table;

identifying a translation suggestion for each element of the graphical user interface object by analyzing the generated string relation memory table using an inspector program, wherein the inspector program is a firebug;

presenting the identified translation suggestion for each element to a user;
receiving a user selection of the presented translation suggestion; and
performing a translation of each element based on the received user selection.

2. The method of claim 1, further comprising:
selecting a translation for the element of the graphical user interface object associated with the new software product based on the matched document object model relationship.

3. The method of claim 1, further comprising:
selecting a translation for the element of the graphical user interface object associated with the new software product based on a plurality of user interactions with a graphical user interface associated with a client computing device.

4. The method of claim 2, wherein the generated string relation translation memory table includes a translation rate probability score for each proposed translation of each element within the generated string relation translation memory table.

5. The method of claim 2, wherein the translation is selected based on a highest translation rate probability score for the matched document object model relationship.

6. The method of claim 4, wherein the translation rate probability score for each proposed translation of an element is calculated based on a context of use of each element and a relationship between the element and a plurality of neighboring elements within the graphical user interface object.

7. The method of claim 1, wherein the retrieved document object model identifies at least one neighboring element to the element, and wherein the at least one neighboring element is selected from a group consisting of at least one direct parent element, at least one sibling element, and at least one direct child element.

8. A computer system for context-aware translation to increase translation accuracy based on identifying a context between one or more sibling text strings, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a program integrated information file associated with a graphical user interface object of a software product;
indexing each element string within the received program integrated information file;
generating a base language general availability build of the graphical user interface object using the received program integrated information file;
retrieving a document object model of each element within the generated base language general availability build;
creating a string relation table for the generated base language general availability build using the retrieved document object model for each element and each indexed element string within the received program integrated information file;
generating a string relation translation memory table for at least one language using the created string relation table and a translation resource file associated with the at least one language, and wherein the generated string relation translation memory table includes a translation rate probability score for each element within the graphical user interface object that relates to the accuracy of each translation, and wherein each translation rate probability score is displayed within the generated string relation translation memory table in a color corresponding to a preconfigured threshold value;
generating a base language general availability build for a graphical user interface object associated with a new software product using an indexed program integrated information file associated with the new software product;
retrieving a document object model for each element within the generated base language general availability build for the graphical user interface object associated with the new software product;
matching a document object model relationship associated with an element of the graphical user interface object associated with the new software product with a document object model relationship on the generated string relation translation memory table;
identifying a translation suggestion for each element of the graphical user interface object by analyzing the generated string relation memory table using an inspector program, wherein the inspector program is a firebug;
presenting the identified translation suggestion for each element to a user;
receiving a user selection of the presented translation suggestion; and
performing a translation of each element based on the received user selection.

9. The computer system of claim 8, further comprising:
selecting a translation for the element of the graphical user interface object associated with the new software product based on the matched document object model relationship.

10. The computer system of claim 8, further comprising:
selecting a translation for the element of the graphical user interface object associated with the new software product based on a plurality of user interactions with a graphical user interface associated with a client computing device.

11. The computer system of claim 9, wherein the generated string relation translation memory table includes a translation rate probability score for each proposed translation of each element within the generated string relation translation memory table.

12. The computer system of claim 9, wherein the translation is selected based on a highest translation rate probability score for the matched document object model relationship.

13. The computer system of claim 11, wherein the translation rate probability score for each proposed translation of an element is calculated based on a context of use of each element and a relationship between the element and a plurality of neighboring elements within the graphical user interface object.

14. The computer system of claim 8, wherein the retrieved document object model identifies at least one neighboring element to the element, and wherein the at least one neighboring element is selected from a group consisting of at least one direct parent element, at least one sibling element, and at least one direct child element.

15. A computer program product for context-aware translation to increase translation accuracy based on identifying a context between one or more sibling text strings, the computer program product comprising:

one or more non-transitory computer-readable tangible storage media and program instructions stored on at least one of the one or more non-transitory tangible storage media, the program instructions executable by a processor, the program instructions comprising:

program instructions to receive a program integrated information file associated with a graphical user interface object of a software product;

program instructions to index each element string within the received program integrated information file;

program instructions to generate a base language general availability build of the graphical user interface object using the received program integrated information file;

program instructions to retrieve a document object model of each element within the generated base language general availability build;

program instructions to create a string relation table for the generated base language general availability build using the retrieved document object model for each element and each indexed element string within the received program integrated information file;

program instructions to generate a string relation translation memory table for at least one language using the created string relation table and a translation resource file associated with the at least one language, and wherein the generated string relation translation memory table includes a translation rate probability score for each element within the graphical user interface object that relates to the accuracy of each translation, and wherein each translation rate probability score is displayed within the generated string relation translation memory table in a color corresponding to a preconfigured threshold value;

program instructions to generate a base language general availability build for a graphical user interface object associated with a new software product using an indexed program integrated information file associated with the new software product;

program instructions to retrieve a document object model for each element within the generated base language general availability build for the graphical user interface object associated with the new software product;

program instructions to match a document object model relationship associated with an element of the graphical user interface object associated with the new software product with a document object model relationship on the generated string relation translation memory table;

program instructions to identify a translation suggestion for each element of the graphical user interface object by analyzing the generated string relation memory table using an inspector program, wherein the inspector program is a firebug;

program instructions to present the identified translation suggestion for each element to a user;

program instructions to receive a user selection of the presented translation suggestion; and program instructions to perform a translation of each element based on the received user selection.

16. The computer program product of claim 15, further comprising:

program instructions to select a translation for the element of the graphical user interface object associated with the new software product based on the matched document object model relationship.

17. The computer program product of claim 15, further comprising:

program instructions to select a translation for the element of the graphical user interface object associated with the new software product based on a plurality of user interactions with a graphical user interface associated with a client computing device.

* * * * *